(12) United States Patent
Lin

(10) Patent No.: US 10,673,100 B2
(45) Date of Patent: Jun. 2, 2020

(54) ELECTRIC POWER SYSTEM AND MANAGEMENT METHOD THEREOF

(71) Applicant: MOBILETRON ELECTRONICS CO., LTD., Taichung (TW)

(72) Inventor: Meng-Chang Lin, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 157 days.

(21) Appl. No.: 15/966,404

(22) Filed: Apr. 30, 2018

(65) Prior Publication Data

US 2019/0252733 A1 Aug. 15, 2019

(30) Foreign Application Priority Data

Feb. 14, 2018 (TW) .............................. 107105418 A

(51) Int. Cl.
*H01M 10/42* (2006.01)
*H01M 10/48* (2006.01)

(52) U.S. Cl.
CPC ....... *H01M 10/425* (2013.01); *H01M 10/482* (2013.01); *H01M 2010/4271* (2013.01)

(58) Field of Classification Search
CPC ............. H01M 10/425; H01M 10/485; H01M 2010/4271

(Continued)

(56) References Cited

U.S. PATENT DOCUMENTS

| 8,183,870 | B1 * | 5/2012 | Davies | .............. | H01M 10/4207 320/118 |
| 8,570,047 | B1 * | 10/2013 | Davies | .............. | H01M 10/4207 324/434 |

(Continued)

FOREIGN PATENT DOCUMENTS

| TW | M338413 U | 8/2008 |
| TW | 201212472 A | 3/2012 |

(Continued)

OTHER PUBLICATIONS

Examination Report for TW107105418, dated Oct. 9, 2018, Total of 7 pages.

(Continued)

*Primary Examiner* — M Baye Diao
(74) *Attorney, Agent, or Firm* — Tracy M Helms; Apex Juris, PLLC.

(57) ABSTRACT

An electric power system and a management method thereof. The electric power system includes a plurality of battery packs and a battery management apparatus. Each of the battery packs includes a casing, a battery cell assembly disposed in the casing, an encoder, and a monitoring unit, wherein the encoder could generate one of a plurality of encoding configurations and has an operating section which is adapted to be manually set the encoding configuration by a user; the monitoring unit senses a state of the battery cell assembly and generates an identification code according to the encoding configuration of the encoder, and outputs a state signal including the identification code. The battery management apparatus receives the state signal of each of the monitoring unit and obtain the state of the corresponding battery cell assembly according to the identification code of the received state signal.

10 Claims, 4 Drawing Sheets

(58) Field of Classification Search
USPC .......................................................... 429/61
See application file for complete search history.

(56) References Cited

U.S. PATENT DOCUMENTS

| | | | |
|---|---|---|---|
| 9,099,877 B2* | 8/2015 | Banos | H02J 7/0016 |
| 9,812,732 B2* | 11/2017 | Jiang | H01M 10/425 |
| 9,931,118 B2* | 4/2018 | Shelton, IV | G16H 40/40 |
| 2017/0358832 A1* | 12/2017 | Sun | B60L 50/66 |
| 2019/0245369 A1* | 8/2019 | Banos | H01M 10/425 |

FOREIGN PATENT DOCUMENTS

| | | | |
|---|---|---|---|
| TW | 201223069 A | 6/2012 | |
| TW | 201448320 A | 12/2014 | |
| TW | 201606618 A | 2/2016 | |
| TW | I606628 B | 11/2017 | |

OTHER PUBLICATIONS

Search Report for TW107105418, dated Oct. 9, 2018, Total of 1 page.
English Abstract for TW201212472, Total of 1 page.
English Abstract for TW201223069, Total of 1 page.
English Abstract for TW201448320, Total of 1 page.
English Abstract for TW201606618, Total of 1 page.
English Abstract for TW1606628, Total of 1 page.
English Abstract of corresponding US patent publication US2009219660 for TWM338413, Total of 1 page.

* cited by examiner

ELECTRIC POWER SYSTEM AND MANAGEMENT METHOD THEREOF

BACKGROUND OF THE INVENTION

Technical Field

The present invention relates generally to an electric power system, and more particularly to an electric power system, which uses a plurality of battery packs, and a management method thereof.

Description of Related Art

With the advancement in technology, the demand of electric energy is increased. As for the demand of large electric power, AC power or a battery pack formed by connecting a plurality of battery modules in series can be used as a power source. The advantage of using the battery pack as a power source is that the power source is movable, which is not limited to be used at a fixed location.

A conventional battery pack usually includes a plurality of battery cell assemblies and a monitoring unit disposed for monitoring the battery pack, wherein the battery cell assemblies are adapted to supply power. The monitoring unit is electrically connected to the battery cell assemblies to sense a state of each of the battery cell assemblies, such as voltage, current, temperature, etc. The monitoring unit would compile the state of the one of the battery cell assemblies and the corresponding identification code into a state signal to be output, so that the battery management apparatus could subsequently recognize the battery packs. The identification code is burned into a non-volatile memory of the monitoring unit. Therefore, if the identification code needs to be changed later, the identification code stored in the non-volatile memory should be re-burned via a corresponding recording device.

When there are a plurality of battery packs applied to an electric power system, the electric power system includes a battery management apparatus for communicating with the battery packs. However, when any of the battery packs needs to be replaced by a new battery pack, an identification code of the new battery pack should be set into the battery management apparatus by a user, or alternatively, the new battery pack is required to be re-burned to include the identification code identical with the identification code of the removed battery pack, which is an inconvenient process.

BRIEF SUMMARY OF THE INVENTION

In view of the above, the primary objective of the present invention is to provide an electric power system and a management method thereof, which could allow a user to easily adjust an identification code of a battery pack, simplifying steps of setting the identification code.

The present invention provides an electric power system, which is adapted to supply power to a load, wherein the electric power system includes a plurality of battery packs and a battery management apparatus. The battery packs are adapted to supply power to the load. Each of the battery packs includes a casing, a battery cell assembly, an encoder, and a monitoring unit, wherein the encoder is adapted to generate one of plural kinds of encoding configurations and has an operating section which is adapted to be manually set the one of the encoding configurations by a user. The battery cell assembly is disposed in the casing; the monitoring unit is electrically connected to the battery cell assembly and the encoder to sense a state of the battery cell assembly and generates an identification code according to the encoding configuration of the encoder, and outputs a state signal. The state signal comprises the identification code and the state of the battery cell assembly. The battery management apparatus is electrically connected to the monitoring units and receives the state signal outputted by each of the monitoring units, whereby to obtain the state of the battery cell assembly of the corresponding battery pack according to the identification code of the received state signal.

The present invention provides a management method of an electric power system, which includes steps of: provide a plurality of battery packs, wherein each of the battery packs comprises a battery cell assembly and an encoder; each of the encoders is adapted to generate one of plural kinds of encoding configurations, and has an operating section which is adapted to be manually set the one of the encoding configurations by a user; set the encoding configuration of each of the encoders via the operating section of each of the battery packs; generate an identification code according to encoding configuration of each of the encoders, wherein each of the identification codes corresponds to one of the battery packs; sense a state of each of the battery cell assemblies; output a state signal according to each of the identification codes and the state of each of the battery cell assemblies, wherein each of the state signals comprises the corresponding identification code and the state of the corresponding battery cell assembly; receive the state signals and obtaining the state of the battery cell assembly of the corresponding battery pack according to the identification code of the received state signal.

With the aforementioned design, the user could change the code configuration through the operating section of the encoder, so as to change the identification code of the battery pack. In this way, the battery pack could be a universal battery pack. In other words, the battery pack is not required to set a unique identification code when the battery pack is manufactured. When any of the battery packs needs to be replaced, the original battery pack is removed first. Then, the new battery pack is provided, and the encoding configuration of the encoder of the new battery pack is set to be the same as the encoding configuration of the encoder of the removed battery pack.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
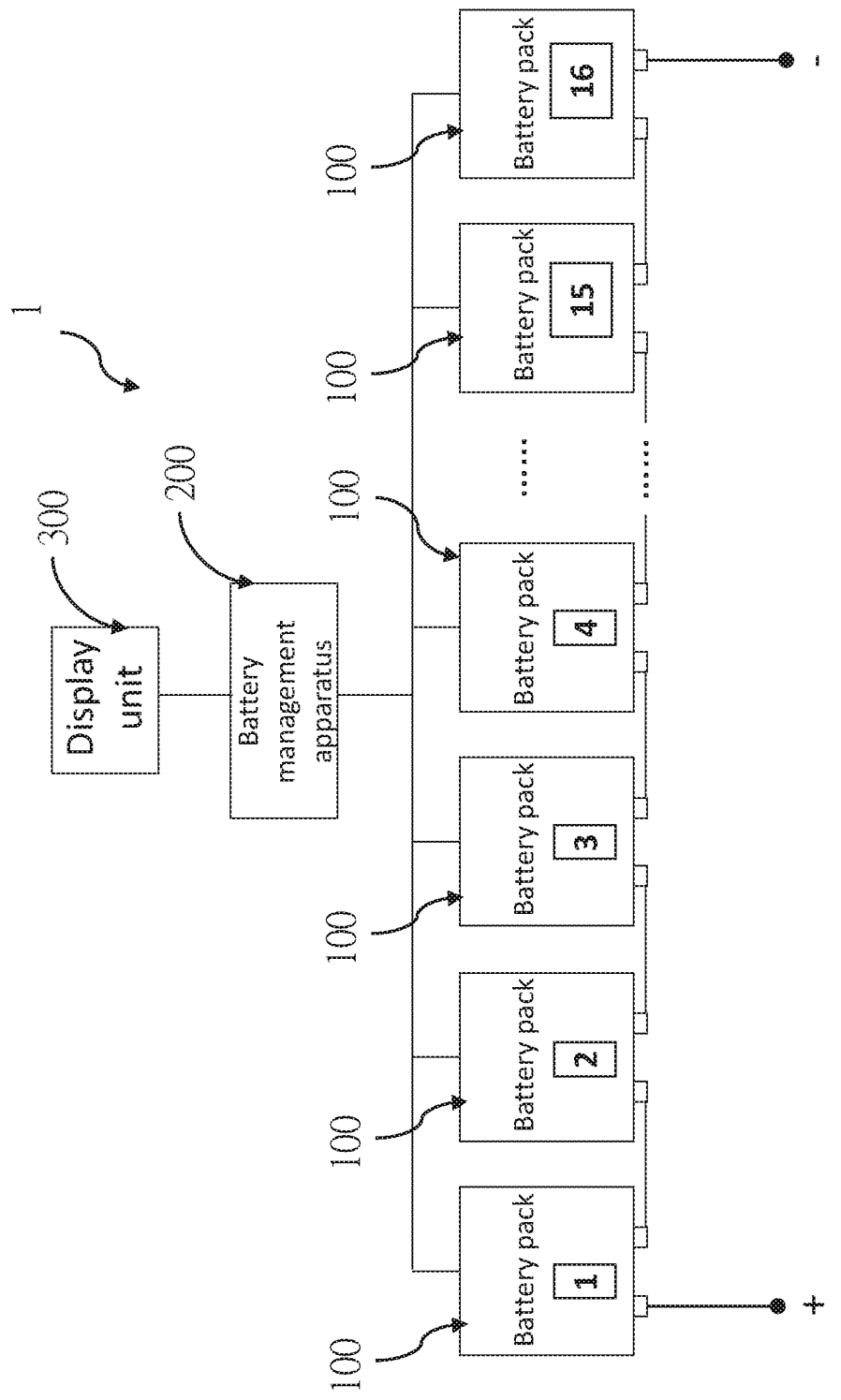
FIG. 1 is a block diagram of the electric power system according to an embodiment of the present invention.

An electric power system 1 of an embodiment according to the present invention is illustrated in FIG. 1, wherein the electric power system 1 is adapted to supply power to a load of an electric car as an example, and includes a plurality of battery packs 100, a battery management apparatus 200, and a display unit 300.

Figure 2:
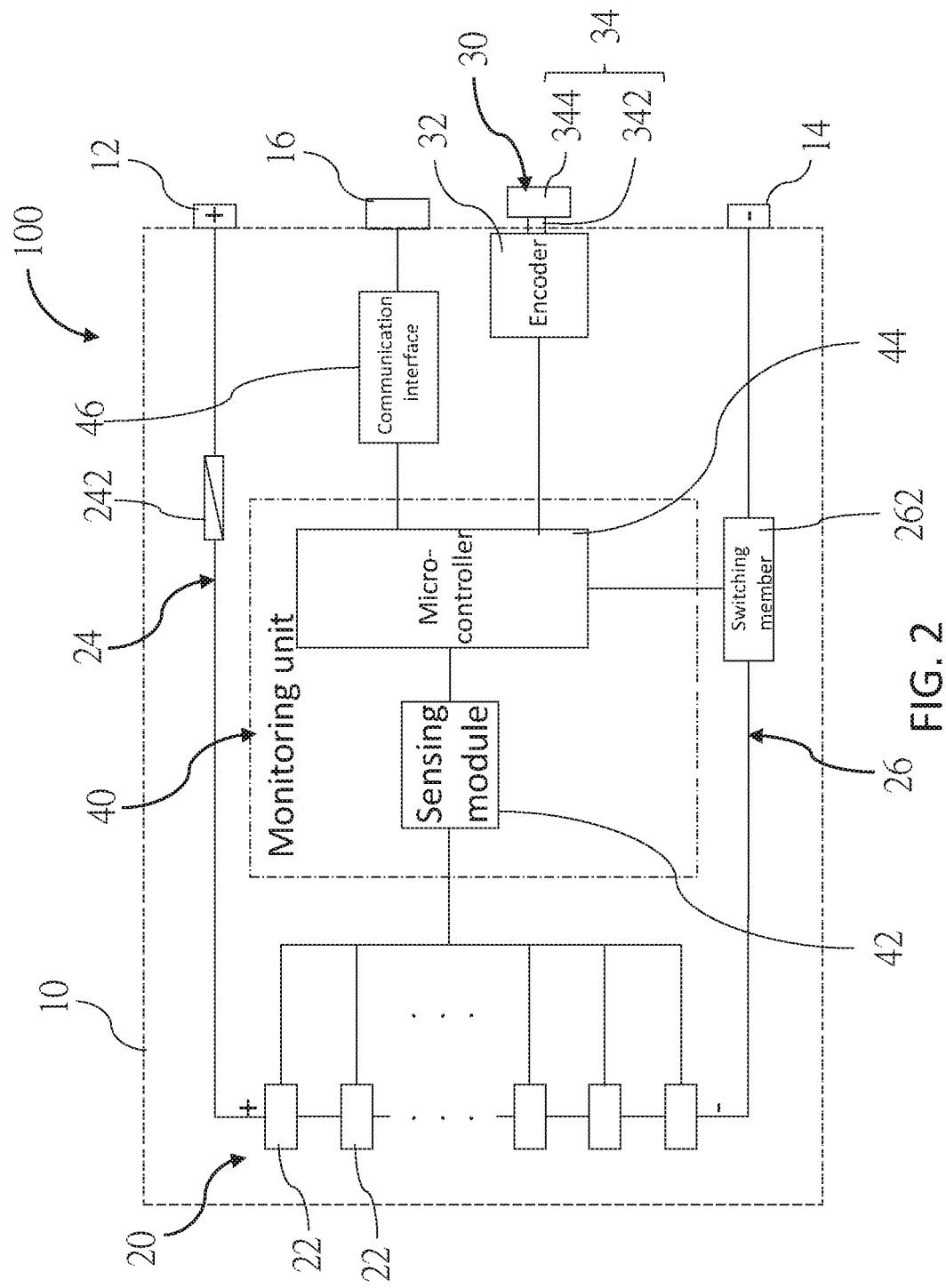
FIG. 2 is a block diagram of the battery pack of the electric power system according to the embodiment of the present invention.
Figure 3:
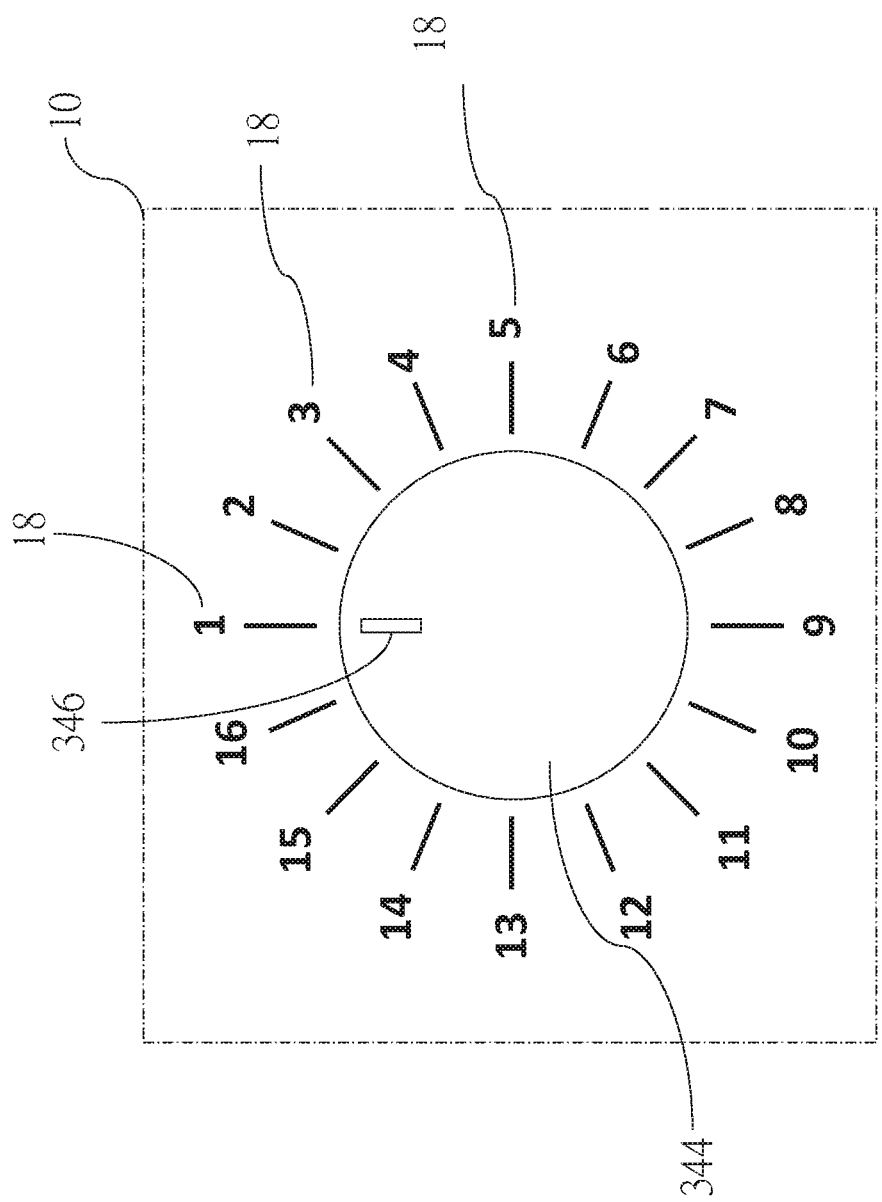
FIG. 3 is a schematic diagram, showing the knob and the coded marks of the battery pack according to the embodiment of the present invention.

In the current embodiment, the battery packs 100 are electrically connected in series for supplying power to the load. In order to illustrate easily, we will only describe the details of one of the battery packs 100 in the following paragraphs, for the battery packs 100 have substantially the same configuration. As shown in FIG. 2 and FIG. 3, the battery pack 100 includes a casing 10, a battery cell assembly 20, an encoder 30, and a monitoring unit 40 which is disposed for monitoring the battery pack 100.

A positive terminal 12, a negative terminal 14, and a communication terminal 16 are disposed on the casing 10.

The battery cell assembly 20 is disposed in the casing 10 and includes a plurality of battery cells 22 connected in series. A positive electrode of the battery cell assembly 20 is electrically connected to the positive terminal 12 via a first conductive member 24, and a negative electrode of the battery cell assembly 20 is electrically connected to the negative terminal 14 via a second conductive member 26, so that the battery cell assembly 20 could output power from the positive terminal 12 and the negative terminal 14. In the current embodiment, either the first conductive member 24 or the second conductive member 26 includes a switching member 262, while another one includes a fuse 242. More specifically, the positive electrode of the battery cell assembly 20 is electrically connected to the positive terminal 12 via the fuse 242, and the negative electrode of the battery cell assembly 20 is electrically connected to the negative terminal 14 via the switching member 262, wherein the switching member 262 is controllable to be turned on or off. In practice, the position of the fuse 242 and the position of the switching member 262 could be exchanged. However, at least one of the fuse 242 and the switching member 262 could be omitted in other embodiments.

The encoder 30 could generate one of plural kinds of encoding configurations and has an encoding section 32 and an operating section 34, wherein the encoding section 32 is adapted to generate one of the encoding configurations according to an operation executed on the operating section 34. The operating section 34 allows a user to manually set one of the encoding configurations. The encoding section 32 is disposed in the casing 10, and the operating section 34 extends out of the casing 10. In the current embodiment, the encoder 30 is an encoding switch having four output pins as an example, wherein the encoder 30 could generate sixteen encoding configurations. The operating section 34 includes a rotary shaft 342 and a knob 344 connected to the rotary shaft 342. The rotary shaft 342 could be rotated between a plurality of rotation angles, wherein each of the rotation angles makes the encoding section 32 generates one of the encoding configurations.

As shown in FIG. 3, in order to allow the user to identify the generated code configurations, a plurality of coded marks 18 are disposed on the casing 10 at a periphery of the operating section 34 (i.e., the numerals 1 to 16 and the corresponding scales in FIG. 3), wherein each of the coded marks 18 corresponds to one of the rotation angles of the rotary shaft 342. An indicator 346 is disposed on the knob 344, wherein the knob 344 is adapted to be rotated by the user, so as to move the indicator 346 to correspond to one of the coded marks 18. In practice, the indicator 346 could be disposed at any position on the operating section 34, as long as the indicator 346 could correspond to one of the coded marks 18 after the rotary shaft 342 is rotated.

The monitoring unit 40 is electrically connected to the battery cell assembly 20 and the encoding section 32 of the encoder 30. In the current embodiment, the monitoring unit 40 includes a sensing module 42 and a microcontroller 44, wherein the sensing module 42 is electrically connected to the battery cell assembly 20 to sense a state of the battery cell assembly 20. The sensed state includes at least one of a total voltage of the battery cell assembly 20, a total current of the battery cell assembly 20, a voltage of each of the battery cells 22, and a temperature of each of the battery cells 22. The microcontroller 44 is electrically connected to the sensing module 42, the encoder 30, and the switching member 262. In addition, the microcontroller 44 is further connected to the communication terminal 16 via a communication interface 46, wherein the communication interface 46 is adapted to convert the signal outputted by the microcontroller 44 into a bus signal, such as a CAN-BUS signal. The microcontroller 44 generates an identification code according to the generated code configuration of the encoder 30, and outputs a state signal according to the identification code and the state of the battery cell assembly 20, and then outputs the state signal which is converted into the corresponding bus signal via the communication interface 46. Moreover, the monitoring unit 40 could further control the switching member 262 to be turned off, so that the battery cell assembly 20 stops outputting the power to the positive terminal 12 and the negative terminal 14, whereby to cut off the power outputted from the battery pack 100.

In this way, the state signal outputted by the battery pack 100 includes the identification code corresponding to the code configuration of the encoder 30 and the state of the battery cell assembly 20. The code configuration could be manually changed by the user via the operating section 34 of the encoder 30, so as to change the identification code of the battery pack 100, and make the battery pack 100 of the current embodiment become a universal battery pack 100. In other words, it is not required to set a unique identification code for the battery pack 100 when the battery pack 100 is manufactured.

The battery management apparatus 200 is connected to the communication terminal 16 of each of the battery packs 100 via a bus, whereby to be electrically connected to and communicate with the monitoring units 40. In addition, the battery management apparatus 200 is electrically connected to the display unit 300. When the user assembles the electric power system 1, the encoding configuration could be set directly on the encoder 30 of each of the battery packs 100. Since the operating section 34 is located outside of the casing 10, the encoding configuration could be easily adjusted by the user. After the encoding configurations of the battery packs 100 are set to be different from one another (i.e., the numerals 1 to 16 in FIG. 1), each of the battery packs 100 could send the state signal thereof to the battery management apparatus 200. In this way, when the battery management apparatus 200 analyzes the received state signal, the battery management apparatus 200 could determine that the received state signal is sent by which of the battery packs 100.

Figure 4:
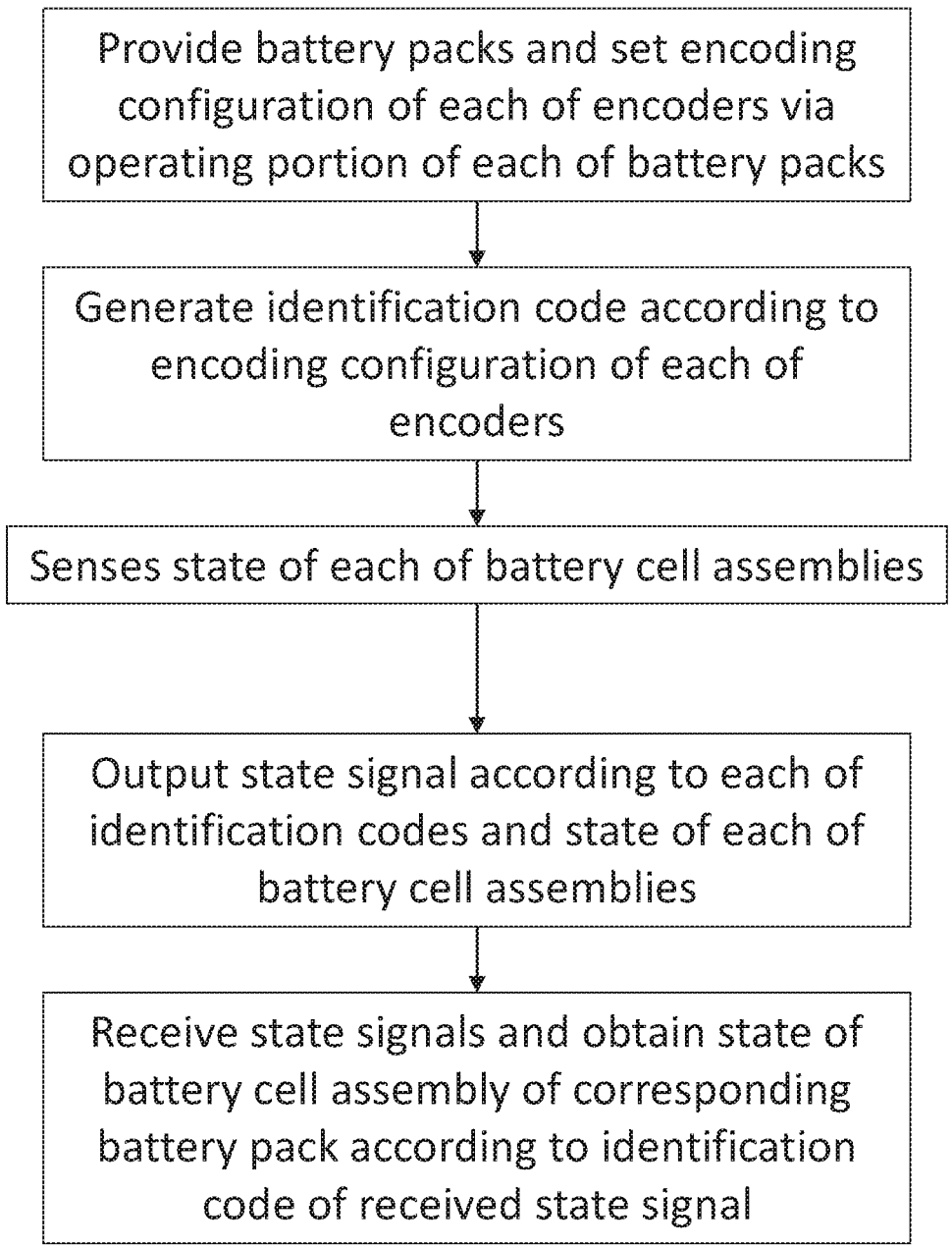
FIG. 4 is a flowchart of the management method of the electric power system according to the embodiment of the present invention.

With the aforementioned design, a management method illustrated in FIG. 4 which includes the following steps could be executed.

First, the battery packs 100 are provided and are electrically connected in series. An encoding configuration is set to each of the battery packs 100 through the operating section 34 of the encoder 30.

The monitoring unit 40 generates the identification codes according to the encoding configuration of each of the encoders 30, wherein each of the identification codes represents a corresponding one of the battery packs 100.

Each of the monitoring units 40 senses the state of one of the battery cell assembly 20 and outputs the state signal to the bus according to the corresponding identification code and the state of the corresponding battery cell assembly 20. Each of the state signals includes one of the identification codes and the state of one of the battery cell assemblies 20.

The battery management apparatus 200 receives the state signals through the bus and obtains the state of each battery cell assembly 20 of the corresponding battery packs 100 according to the identification code of the received state signal. In this way, the battery management apparatus 200 could manage the state of each of the battery packs 100 and send a control signal to the corresponding battery pack 100, so that the monitoring unit 40 of the corresponding battery pack 100 could control the switching member 262 to be turned on or off. In addition, the battery management apparatus 200 could display the state of each of the battery packs 100 through the display unit 300, wherein the state of the battery packs 100 includes the state of the battery cell assembly 20, on and off states of the switching member 262, etc.

In order to avoid human error, in the current embodiment, the management method further includes the following steps. When the battery management apparatus 200 determines that the received identification codes of the monitoring units 40 are repeated, a warning message is sent. In the current embodiment, the warning message includes the repeated identification code and could be displayed via the display unit 300 to warn the user that which of the identification codes are repeated, and it is required for the corresponding encoder 30 to be re-adjusted. In practice, the warning message could be presented in the forms of sounds and lights.

It is worth mentioning that, with the electric power system 1 of the present invention, when either one of the battery packs 100 needs to be replaced, it only requires to remove the original battery pack 100 and install the new battery pack 100, wherein, the encoding configuration of the encoder 30 of the new battery pack 100 is set to be the same as the encoding configuration of the encoder 30 of the removed battery pack. In this way, the problem that the identification code of the conventional electric power system needs to be re-burned or to be reset via the battery management apparatus could be solved.

It must be pointed out that the embodiments described above are only some preferred embodiments of the present invention. All equivalent structures and methods which employ the concepts disclosed in this specification and the appended claims should fall within the scope of the present invention.

What is claimed is:

1. An electric power system, which is adapted to supply power to a load, comprising:
a plurality of battery packs adapted to supply power to the load, wherein each of the battery packs comprises a casing, a battery cell assembly, an encoder, and a monitoring unit, wherein the encoder is adapted to generate one of plural kinds of encoding configurations, and has an operating section which is adapted for a user to manually set the encoding configurations; the battery cell assembly is disposed in the casing; the monitoring unit is electrically connected to the battery cell assembly and the encoder to sense a state of the battery cell assembly and generates an identification code according to the encoding configuration of the encoder, and outputs a state signal; the state signal comprises the identification code and the state of the battery cell assembly; and
a battery management apparatus which is electrically connected to the monitoring units and receives the state signal outputted by each of the monitoring units, whereby to obtain the state of the battery cell assembly of the corresponding battery pack according to the identification code of the received state signal.

2. The electric power system of claim 1, wherein when the battery management apparatus determines that the received identification codes of the monitoring units are repeated, a warning message is sent.

3. The electric power system of claim 2, wherein the warning message comprises the identification code which is repeated.

4. The electric power system of claim 1, wherein each of the encoders has an encoding section; the encoding section is adapted to generate the one of the encoding configurations in response to the operating section; each of the encoding sections is disposed in the corresponding casing and is electrically connected to the corresponding monitoring unit; each of the operating sections extends out of the corresponding casing.

5. The electric power system of claim 4, wherein the operating section of each of the encoder comprises a rotary shaft; the rotary shaft is controllable to rotate between a plurality of rotation angles; each of the rotation angles corresponds to one of the encoding configurations generated by the corresponding encoding section; each of the operating sections is disposed with an indicator; the casing of each of the battery packs is disposed with a plurality of coded marks which are located at a periphery of the corresponding operating section; each of the coded marks corresponds to one of the rotation angles of the corresponding rotary shaft, and each of the indicators corresponds to one of the coded marks on the corresponding battery pack.

6. The electric power system of claim 5, wherein the operating section of each of the encoder comprises a knob connected to the corresponding rotary shaft; each of the knobs has the indicator; the coded marks of each of the battery packs surround a periphery of the corresponding knob.

7. The electric power system of claim 6, wherein each of the battery packs comprises a positive terminal and a negative terminal; a positive electrode of each of the battery cell assemblies is electrically connected to the corresponding positive terminal via a conductive member, and a negative electrode of each of the battery cell assemblies is electrically connected to the corresponding negative terminal via another conductive member, wherein either the conductive member or the another conductive member includes a switching member; the switching member is electrically connected to the corresponding monitoring unit and is controlled by the corresponding monitoring unit to be turned on or off.

8. A management method of an electric power system, comprising steps of:
providing a plurality of battery packs, wherein each of the battery packs comprises a battery cell assembly and an encoder; each of the encoders is adapted to generate one of plural kinds of encoding configurations, and has an operating section which is adapted for a user to manually set the encoding configurations;
setting the encoding configuration of each of the encoders via the operating section of each of the battery packs;

generating an identification code according to encoding configuration of each of the encoders, wherein each of the identification codes corresponds to one of the battery packs;

sensing a state of each of the battery cell assemblies;

outputting a state signal according to each of the identification codes and the state of each of the battery cell assemblies, wherein each of the state signals comprises the corresponding identification code and the state of the corresponding battery cell assembly; and receiving the state signals and obtaining the state of the battery cell assembly of the corresponding battery pack according to the identification code of the received state signal.

9. The management method of claim 8, further comprising a step of sending a warning message when the received identification code is determined as being repeated.

10. The management method of claim 9, wherein the warning message comprises the identification code which is repeated.

* * * * *